US012402608B2

(12) United States Patent
Van Cutsem et al.

(10) Patent No.: US 12,402,608 B2
(45) Date of Patent: Sep. 2, 2025

(54) BEEHIVE WITH POLLEN TRAP

(71) Applicant: BEEODIVERSITY, Brussels (BE)

(72) Inventors: Michaël Van Cutsem, La Hulpe (BE); Bach Kim Nguyen, Sambreville (BE)

(73) Assignee: BEEODIVERSITY, Brussels (BE)

( * ) Notice: Subject to any disclaimer, the term of this patent is extended or adjusted under 35 U.S.C. 154(b) by 262 days.

(21) Appl. No.: 18/033,323

(22) PCT Filed: Nov. 22, 2021

(86) PCT No.: PCT/EP2021/082416
§ 371 (c)(1),
(2) Date: Apr. 21, 2023

(87) PCT Pub. No.: WO2022/106670
PCT Pub. Date: May 27, 2022

(65) Prior Publication Data
US 2023/0389526 A1 Dec. 7, 2023

(30) Foreign Application Priority Data
Nov. 23, 2020 (EP) .................................. 20209302

(51) Int. Cl.
*A01K 47/06* (2006.01)
(52) U.S. Cl.
CPC .................................. *A01K 47/06* (2013.01)
(58) Field of Classification Search
CPC ..................................................... A01K 47/06
(Continued)

(56) References Cited

U.S. PATENT DOCUMENTS

| | | | | |
|---|---|---|---|---|
| 1,402 A | * | 11/1839 | Sholl ...................... | A01K 47/06 449/13 |
| 29,394 A | * | 7/1860 | McGonnigle .......... | A01K 47/06 449/14 |

(Continued)

FOREIGN PATENT DOCUMENTS

| | | | | |
|---|---|---|---|---|
| CN | 104472398 A | * | 4/2015 | |
| CN | 107897046 A | * | 4/2018 | ............. A01K 47/00 |

(Continued)

OTHER PUBLICATIONS

European Patent Office, International Search Report issued in PCT/IB2021/082416, mailed Feb. 22, 2022.

(Continued)

*Primary Examiner* — Morgan T Jordan
(74) *Attorney, Agent, or Firm* — Ferguson Case Orr Paterson

(57) ABSTRACT

Beehive for a bee species, the bee species comprise pollen collecting bees, the beehive comprising: a plurality of first openings (2) designed such that the pollen collecting bees of the beehive enter the beehive through these first openings (2) and that the pollen collecting bees lose their pollen, when they enter through the first openings (2); and a plurality of second openings designed such that the pollen collecting bees of the beehive can enter the beehive through these second openings (3) and that the pollen collecting bees keep their pollen, when they enter through the second openings (3), wherein the number of second openings is larger than 5% of the total number of openings (2, 3) constituted by the accumulative number of first openings (2) and second openings (3).

13 Claims, 1 Drawing Sheet

(58) Field of Classification Search
USPC .............................................. 449/20, 23–25
See application file for complete search history.

(56) References Cited

U.S. PATENT DOCUMENTS

| | | | | | |
|---|---|---|---|---|---|
| 37,363 | A | * | 1/1863 | Smith | A01K 47/00 449/25 |
| RE1,484 | E | * | 5/1863 | Langstroth | 449/35 |
| 40,600 | A | * | 11/1863 | Bingham | A01K 47/06 449/14 |
| 46,584 | A | * | 2/1865 | Penoyer | A01K 47/06 449/22 |
| 56,230 | A | * | 7/1866 | Justin | A01K 47/06 449/22 |
| 59,593 | A | * | 11/1866 | Guthrie | A01K 47/06 449/24 |
| 61,164 | A | * | 1/1867 | Colvin | A01K 47/06 449/20 |
| 85,884 | A | * | 1/1869 | Wood | A01K 47/06 449/13 |
| 150,935 | A | * | 5/1874 | Bush | A01K 47/06 449/24 |
| 264,898 | A | * | 9/1882 | Phillips | A01K 47/06 449/25 |
| 808,144 | A | * | 12/1905 | Dempsey | A01K 47/06 449/24 |
| 870,274 | A | * | 11/1907 | Caperton | A01K 47/06 449/24 |
| 987,256 | A | * | 3/1911 | Porter | A01K 47/06 449/23 |
| 1,017,233 | A | * | 2/1912 | Rahn | A01K 47/06 449/25 |
| 1,341,364 | A | * | 5/1920 | Fisk | A01K 49/00 449/8 |
| 1,363,922 | A | * | 12/1920 | Rowe | A01K 57/00 449/25 |
| 1,414,284 | A | * | 4/1922 | Jones | A01K 53/00 449/9 |
| 1,462,711 | A | * | 7/1923 | Lovett | A01K 47/06 449/21 |
| 1,554,305 | A | * | 9/1925 | Sullivan | A01K 47/06 449/23 |
| 2,025,908 | A | * | 12/1935 | Schlegel | A01K 47/06 449/25 |
| 2,227,525 | A | * | 1/1941 | Williams | A01K 47/06 449/24 |
| 2,294,966 | A | * | 9/1942 | Dreyfus | E06B 9/52 156/1 |
| 2,403,840 | A | * | 7/1946 | Ashurst | A01K 49/00 119/6.5 |
| 2,575,102 | A | * | 11/1951 | Evans | A01K 47/06 449/13 |
| 3,108,294 | A | * | 10/1963 | Brown, Jr. | A01K 47/06 43/65 |
| 3,704,471 | A | * | 12/1972 | Bielby | A01K 47/06 449/13 |
| 3,995,338 | A | * | 12/1976 | Kauffeld | A01K 47/06 449/19 |
| 4,158,900 | A | * | 6/1979 | Musgrove | A01K 47/06 449/23 |
| 4,229,848 | A | * | 10/1980 | Shaparew | A01K 47/06 449/23 |
| 4,412,363 | A | * | 11/1983 | Robson | A01K 47/06 449/19 |
| 4,435,867 | A | * | 3/1984 | Jeong | A01K 47/06 428/134 |
| 4,594,744 | A | * | 6/1986 | Ferrari | A01K 47/06 449/19 |
| 5,019,011 | A | * | 5/1991 | Williams | A01K 47/06 449/20 |
| 10,798,922 | B1 | * | 10/2020 | Woods | A01K 47/06 |
| D998,900 | S | * | 9/2023 | Van Cutsem | D30/109 |
| 2005/0064788 | A1 | * | 3/2005 | Le Pabic | A01K 51/00 449/3 |
| 2006/0148379 | A1 | * | 7/2006 | Lappas | A01K 47/00 449/29 |
| 2008/0280528 | A1 | * | 11/2008 | Mudd | A01K 47/06 449/2 |
| 2009/0068926 | A1 | * | 3/2009 | Venglar | A01K 57/00 449/20 |
| 2012/0295514 | A1 | * | 11/2012 | Keppens | A01K 47/06 449/13 |
| 2013/0019518 | A1 | * | 1/2013 | Miller | A01M 1/106 43/107 |
| 2018/0064089 | A1 | * | 3/2018 | Iori | A01M 1/103 |
| 2018/0235190 | A1 | * | 8/2018 | Vaandrager | A01K 47/06 |

FOREIGN PATENT DOCUMENTS

| | | | | |
|---|---|---|---|---|
| FR | 1223455 | | 6/1960 | |
| FR | 2911248 | A1 * | 7/2008 | A01K 47/06 |
| FR | 2943217 | A1 * | 9/2010 | A01K 47/02 |
| FR | 3095105 | | 10/2020 | |
| FR | 3095105 | A1 * | 10/2020 | |
| GB | 2055542 | A * | 3/1981 | A01K 47/06 |
| GB | 2119619 | A * | 11/1983 | A01K 47/06 |
| JP | 3192877 | U * | 9/2014 | |
| KR | 20110007869 | A * | 1/2011 | |
| KR | 20110006078 | U * | 6/2011 | |
| KR | 20130030527 | A * | 3/2013 | |
| KR | 200474009 | Y1 * | 8/2014 | |
| KR | 101506126 | B1 * | 3/2015 | |
| KR | 20150001149 | U * | 3/2015 | |
| KR | 20160052997 | A * | 5/2016 | |
| KR | 20170009523 | A * | 1/2017 | |
| KR | 20190001048 | U * | 5/2019 | |
| KR | 20190001547 | U * | 6/2019 | |
| KR | 20190081668 | A * | 7/2019 | |
| KR | 20200000136 | U * | 1/2020 | |
| KR | 20200015307 | A * | 2/2020 | |
| KR | 20200021190 | A * | 2/2020 | |
| KR | 102098390 | B1 * | 4/2020 | |
| KR | 200491503 | Y1 * | 4/2020 | |
| KR | 20200001676 | U * | 7/2020 | |
| KR | 20200113624 | A * | 10/2020 | |
| SI | 24673 | A * | 10/2015 | |
| WO | 2012011881 | | 1/2017 | |

OTHER PUBLICATIONS

European Patent Office, International Written Opinion issued in PCT/IB2021/082416, mailed Feb. 22, 2022.

* cited by examiner

BEEHIVE WITH POLLEN TRAP

TECHNICAL FIELD

The present invention relates to a beehive with a pollen trap and a method for harvesting pollen.

PRIOR ART

Pollen is harvested by humans for different purposes. The principal purpose is to eat the pollen or to keep the pollen for periods of the year, where the bees have not sufficient pollen. In order to harvest pollen, a pollen trap is installed in front of the entrance of the pollen collecting bees. The pollen trap causes all pollen collected from the bees to fall in the trap, when the bee enters the beehive through the pollen trap. The pollen trap comprises normally a plurality of openings designed such that, when the pollen collecting bee squeezes through the opening to enter the beehive, the collected pollen is combed from its legs.

The *Apis mellifera* species, commonly known as the honeybee, includes several races. The honeybees of each race live in colonies comprising different types of bees. Worker bees, a queen bee, and finally the male bees or drones. Only the worker bees collect the pollen. The different types of bees are different in size. In ascending order of size, we find first the workers, the males and then the queen. Therefore, if a pollen trap is installed in front of the entrance of the beehive, the size of the inlet holes in the pollen trap is be adapted to the size of the workers. All worker bees enter through the openings of the pollen trap and 100% of their pollen is collected, notwithstanding the potential remaining side entrances of the pollen trap for the queen and male bees. This guarantees that all pollen collecting bees go through the pollen trap and the 100% of the pollen collected by the pollen collecting bees is harvested.

CN207151612 discloses a beehive with a removable insert for the pollen trap. The different inserts have openings of different size depending on the bee species. Thus, a first insert for a first bee species is used, when the first bee breeds lives in the beehive and a second insert for a second bee breeds is used, when the second bee breeds lives in the beehive.

CN206909436 discloses a beehive with a pollen trap having such pollen collecting openings. In addition, the beehive comprises second larger openings which are designed to work exclusively as exit for the bees.

CN205794475 discloses a beehive with a pollen trap having such pollen collecting openings. In addition, the beehive comprises second larger openings which are designed as entrance for the queen bee.

CN205320916 discloses a beehive with an entrance. The entrance is blocked by a plate with different kind of openings: opening for Italian bees, opening for Chinese bees, an opening for ventilation and a pollen collection opening. The plate can be moved that one of the previous types of openings is connected to the entrance of the beehive. The other types of openings are not connected to the entrance of the beehive.

FR3095105 discloses a pollen trap with 222 first openings of 6 mm for worker bees (98.7% of a total of openings consisting of the first openings and the second openings) and 3 second openings of 8 mm for drones (1.3% of the total of openings).

FR1223455 discloses a horizontal pollen trap which comprises in a horizontal layer/panel three types of openings. Very small openings of 1-2 mm for removing condensation water. First openings between 4.5-5.5 mm for removing pollen from the worker bees. Second openings of 12-17 mm for male bees. There are around 150 first openings (98.6%) versus 2 second openings (1.3%).

WO2012/011881 discloses pollen trap with around 300 first openings 30 for worker bees (<1%) and two second openings for male bees (>99%).

One problem of the pollen trap (for pollen production) of the state of the art is that the pollen trap can only be installed for a short time period like for few days. Otherwise, the bees cannot bring enough pollen in the beehive. If the pollen trap is installed too long, the bee colony would die. Therefore, pollen collection is cumbersome and requires a repeated putting and removing of the pollen trap in front of the entrance of the beehive. Thus, the pollen collection period and the non-collection period must be alternated. This causes also a discontinuity in the pollen collection. If the collected pollen is collected for the purpose of analysing the environment, in particular the biodiversity of plants or the presence of pesticides, this can lead to measurement errors as the collection times are interrupted and the pollen of certain flowers are not collected in the non-collection times. However, a continuous pollen collection is considered impossible, as the bees in the beehive would starve to death.

BRIEF SUMMARY OF THE INVENTION

It is the object of the invention to solve the problems of the state of the art, in particular to provide an improved pollen trap which can be used with less burden.

According to the invention, this object is solved by a beehive comprising a plurality of first openings and a plurality of second openings, wherein the second openings have a diameter larger than the first openings.

According to the invention, this object is solved by a pollen trap member configured to be installed at the entrance of a beehive, the pollen trap member comprising a plurality of first openings and a plurality of second openings, wherein the second openings have a diameter larger than the first openings.

The combination of first openings for pollen collection and second larger openings allows to combine the pollen harvesting with the daily duty of the bees to store the collected pollen in the beehive for their nutrition. Thus, only a part of the pollen brought in the beehive by the pollen collecting bees is harvested and the remaining part of the pollen can be used by the bees for nutrition, storage and/or honey production. This innovation allows a continuous pollen harvesting without harming the bees of the beehive. This allows analysing the harvested pollen without having any measurement breaks due to taking off the pollen trap from the beehive.

The dependent claims refer to further advantageous embodiments. In one embodiment, the beehive is designed/configured for a bee species, the bee species comprise pollen collecting bees.

In one embodiment, the first openings and the second openings are designed such that the pollen collecting bees of the beehive enter the beehive through these first and second openings. That means that the openings must be large enough that the bees fit through the openings.

In one embodiment, the first openings are designed such that the pollen collecting bees of the beehive (can) enter the beehive through these first openings and that the pollen collecting bees lose their pollen, when they enter through the first openings.

In one embodiment, the second openings designed such that the pollen collecting bees of the beehive (can) enter the beehive through these second openings and that the pollen collecting bees keep their pollen, when they enter through the second openings.

In one embodiment, the first openings have all the same diameter.

In one embodiment, the second openings have all the same diameter.

In one embodiment, the number of second openings is larger than 5% of the total number of openings. The total number of openings is constituted by the accumulative number of first openings and second openings. The correct ratio between the number of first openings and the number of second openings is very important. If there are too many first openings, the bees do not have enough pollen for themselves, and they die.

In one embodiment, the number of second openings is smaller than 30% of the total number of openings. If there are too many second openings, the pollen harvesting is not working.

In one embodiment, the number of second openings is between 5% and 30% of the total number of openings constituted by the accumulative number of first openings and second openings. Two years of research and testing resulted in the correct ratio allowing the bees to survive, but also to optimize pollen harvesting in sufficient quantities for laboratory analysis.

In one embodiment, the diameter of the first openings is between 4 mm and 6 mm. The first openings have preferably all the same diameter selected from this range. However, it is also possible that the first openings have different diameters selected from this range. This is the preferred embodiment for the most common honey producing bee in Europe.

In one embodiment, the diameter of the second openings is preferably larger than 6 mm. This is the preferred embodiment for the most common honey producing bee in Europe.

In one embodiment, the diameter of the second openings is preferably smaller than 10 mm, preferably than 8 mm. This is the preferred embodiment for the most common honey producing bee in Europe.

In one embodiment, the first openings have a circular shape and/or the second openings have a circular shape. The circular shape for entrances of beehives and for pollen traps are simple and effective.

In one embodiment, the first openings and the second openings are both connected to the interior of the beehive, preferably contemporaneously connected to the interior of the beehive. Thus, each bee is free to select, if it enters the beehive through one of the first or second openings.

In one embodiment, the beehive comprises a pollen trap including the plurality of first openings.

In one embodiment, the pollen trap/beehive comprises a pollen container for collecting the harvested pollen which the pollen collecting bees loose, when they enter the first openings.

In one embodiment, the pollen trap comprises also the second openings.

In one embodiment, the beehive or the pollen trap comprises a removable member which can be fixed to and removed from an entrance of the beehive or pollen trap, wherein the removable member comprises the plurality of first openings and the plurality of second openings. The removable member is preferably a plate.

In one embodiment, the beehive according to the invention is used in a method for harvesting pollen from the pollen collecting bees entering the first openings of the beehive.

In one embodiment, the first openings are permanently installed in front of the entrance of the beehive to permanently harvest pollen. This allows a permanent pollen harvesting without disturbing the live of the bee population.

In one embodiment, the harvested pollen is periodically analysed. This allows to analyse precisely all the pollen harvested in each period and their amount with respect to other pollen. This gives an incredible insight in the biodiversity of the environment around the beehive. The harvested pollen can also be analysed for the presence of chemicals or other residuals resulting from pollution.

In one embodiment, a conclusion for the environment around the beehive is retrieved from the pollen analysis.

In one embodiment, a plurality of beehives as described previously are situated at different locations, wherein the pollen harvested at each beehive is periodically harvested and analysed to retrieve at least one parameter from the harvested pollen, wherein a measurement map of the at least one parameter is determined from the pollen analysis of the beehives at the different locations.

In one embodiment, the first openings and the second openings are arranged in the pollen trap member such that they are connected both (contemporaneously) to the entrance of the beehive, when the pollen trap member is installed at the entrance of the beehive.

At least some of the first openings and at least some of the second openings are arranged in one common row. In a preferred embodiment, the first openings are arranged in at least two (parallel) rows, preferably three rows. In a preferred embodiment, one of the at least two rows correspond to the common row. Preferably, the common row comprises a sequence of openings alternating one first opening and one second opening.

Other embodiments according to the present invention are mentioned in the appended claims and the subsequent description.

BRIEF DESCRIPTION OF THE DRAWINGS

In the drawings, the same reference numbers have been allocated to the same or analogue element.

DETAILED DESCRIPTION OF AN EMBODIMENT OF THE INVENTION

Other characteristics and advantages of the present invention will be derived from the non-limitative following description, and by making reference to the drawings and the examples.

A beehive according to the invention is an artificial/human-made nest for honeybees. Honeybees live in populations, for some bee types called colonies. Preferably, the beehive is for eusocial bees. Preferably, the beehive is for bees of the genus *apis*. Preferably, the beehive is for honeybees. Preferably, the beehive is configured for one species of a communal bee, preferably of a eusocial bee, preferably of a bee of the genus *apis*, preferably of a honeybee.

Most species (or subspecies) of the communal bees, in particular eusocial bees, in particular bees of the genus *apis*, in particular honeybees comprise different bee-types like a worker bee, a male bee (also called drone) and a queen bee. Different bee-types have normally different sizes and require different entrances for the beehive. Only some of the bee-types, normally just one bee-type, preferably the sterile female or worker bee collects pollen for the population. For simplicity, a bee shall refer to any bee of all bee-types of one species or subspecies of the communal bees. For simplicity, a pollen collecting bee (short forager) shall refer to one bee-type of the bee which actually collects pollen for the population of the bees of the beehive. Foragers to a plurality of bees of the same pollen collecting bee-type. The invention is particular advantageous for the *Apis mellifera*. For certain regions, it might be used with other bee species like the *Apis cerana* in Asia.

For simplicity, the term "collect" or "collecting" is mainly used for the natural process of the foragers collecting pollen from plants. The term "harvesting" instead is used rather to describe the process of retrieving the pollen collected by the foragers. The process of "harvesting" is normally often also called "collecting". This is however not a strict definition and the term "collect" must be read and understood in the correct sense given by its context.

Figure 2:
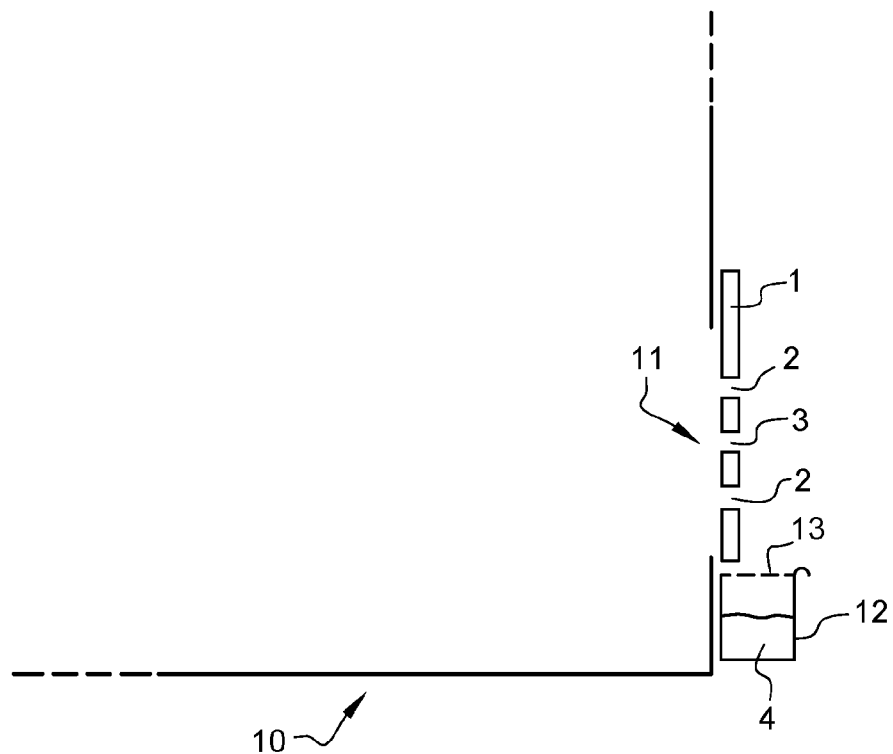
FIG. 2 is schematic cross-sectional view of an embodiment of the beehive.

FIG. 2 shows embodiment of a beehive 10. The beehive is normally made for the population of one bee (species or subspecies). If there are two or more bee species with (roughly) the same diameter, the beehive can obviously be made for the two or more bee species having the same diameter, obviously not at the same time.

The beehive 10 comprises an entrance 11 which allows the foragers to enter the beehive 10. The entrance 10 can be constituted by one common entrance or a plurality of sub-entrances. The entrance 11 of the beehive 10 comprises a plurality of first openings 2 and a plurality of second openings 3. The first openings 2 and/or the second openings 3 are both configured to allow the foragers to enter the beehive 10. This means that the diameter of the first openings 2 and/or the second openings 3 are large enough that the foragers fit through them. This means also that the diameter of the first openings 2 and/or the second openings 3 are small enough that the foragers would actually choose them to enter the beehive 10. The first openings 2 and the second openings 3 are both connected to the entrance 11 and/or to the inside of the beehive 10. The first openings 2 and the second openings 3 are preferably both contemporaneously connected to the entrance 11 and/or to the inside of the beehive 10. The first openings 2 and the second openings 3 are preferably configured that any forager can decide, if it enters the beehive 10 or the entrance 11 via one of the first openings 2 or via one of the second openings 3. Both, the first openings 2 and the second openings 3, allow the forager to enter the beehive 10. The first openings 2 are preferably arranged in a pollen trap member 1. The second openings 3 are preferably arranged in the (same) pollen trap member 1.

The first openings 2 are configured to harvest pollen carried by the foragers, when they enter the beehive 10 through the first openings 2. This is preferably realized by a diameter of the first opening 2 roughly corresponding the diameter of the forager itself such that when the forager squeezes through the first opening 2, the pollen carried is combed from its body and/or legs. In a preferred embodiment, the first openings 2 have a diameter larger than 3.5 millimetres (mm), preferably larger than 4 mm, preferably larger than 4.2 mm, preferably larger than 4.5 mm. In a preferred embodiment, the first openings 2 have a diameter smaller than 6 mm, preferably smaller than 5.5 mm. In a preferred embodiment, the first openings 2 have a preferred diameter of 5 mm. In a preferred embodiment, the first openings 2 have a diameter larger than 90%, preferably than 95%, preferably than 98% of the diameter of the forager. The diameter of a forager is measured in a transverse plane of the abdomen of the bee without considering the legs and wings. The diameter is preferably measured at the position of the body along the longitudinal axis with the largest diameter, normally at the thorax or abdomen of the forager. If the diameter of the forager varies among foragers, among populations and/or among seasonal times, the average diameter is meant. In a preferred embodiment, the first openings 2 have a diameter smaller than 110%, preferably than 105%, preferably than 102% of the diameter of the forager. Thus, for a forager having a diameter of 5 mm, the first opening is preferably between 4.5 mm (90% of its diameter) and 5.5 mm (110% of its diameter) large.

The number of the plurality of first openings 2 is called first number n1. In one embodiment, the beehive 10 or the pollen trap member 1 comprises the n1 first openings 2. In one embodiment, the first number n1 is larger than 50, preferably than 60, preferably than 70, preferably than 80, preferably than 90, preferably than 100. In embodiment, the first number n1 is smaller than 300, preferably than 200, preferably than 150, preferably than 140, preferably than 130, preferably than 120. In the shown embodiment, n1 is 107.

The second openings 3 are configured to or keep the pollen carried by the foragers on the foragers, when they enter the beehive 10 through the second openings 3. This is preferably realized by a diameter of the second opening 3 being larger than the diameter of the forager itself such that when the forager goes through the second opening 3, the pollen carried by the forager is not combed or harvested from its body and/or legs. In a preferred embodiment, the second openings 3 have a diameter larger than 5 millimetres (mm), preferably larger than mm, preferably larger than 6 mm, preferably larger than 6.5 mm. In a preferred embodiment, the second openings 3 have a diameter smaller than 10 mm, preferably smaller than 9 mm, preferably smaller than 9.5 mm, preferably smaller than 8 mm, preferably smaller than 7.5 mm. In a preferred embodiment, the second openings 3 have a preferred diameter of 7 mm. In a preferred embodiment, the second openings 3 have a diameter larger than 100%, preferably than 110%, preferably than 120%, preferably than 130%, preferably than 135% of the diameter of the forager or of the first openings 2. In a preferred embodiment, the second openings 3 have a diameter smaller than 170%, preferably than 160% preferably than 150% of the diameter of the forager or of the first openings 2. If the second openings 3 are too big, the foragers would not accept them any more as their entrance to the beehive. The number of the plurality of second openings 3 is called second number n2. In one embodiment, the beehive 10 or the pollen trap member 1 comprises the n2 second openings 3. In one embodiment, the second number n2 is larger than 5, preferably than 10, preferably than 15, preferably than 20. In embodiment, the second number n2 is smaller than 50, preferably than 40, preferably than 30, preferably than 25. In the shown embodiment, n2 is 21.

The difference between the first openings 2 and the second openings 3 shall be described in the following.

While the first openings 2 are configured to harvest the pollen collected by the foragers, when they go through the first openings 2, the second openings 3 are configured to leave the pollen collected by the foragers on their body, when they go through the second openings 3. This can be achieved by one or a combination of the following embodiments. The diameter of the second openings 3 is larger than the diameter of the first openings 2. In a less preferred embodiment, the first openings 2 and the second openings have different shapes, wherein the shape of the first opening 2 is such that the pollen collected by the foragers is harvested, when they go through the first openings 2 and/or the shape of the second openings 3 is such that the pollen collected by the foragers is kept/left on their body, when they go through the second openings 3. In one embodiment, a special pollen harvesting mechanism could be arranged on the first openings 2 to harvest the pollen collected by the foragers, when they go through the first openings 2, while the second openings 3 lack such a pollen harvesting mechanism.

Figure 1:
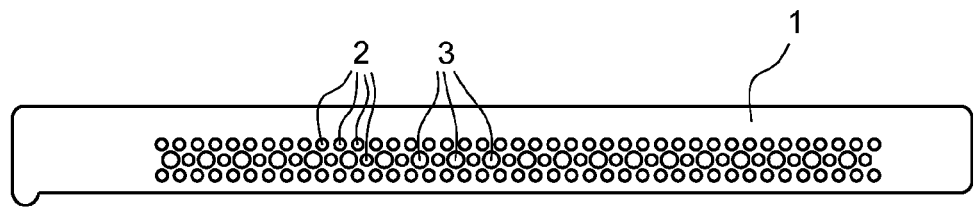
FIG. 1 is a front view of the entrance of the beehive or of the pollen trap member.

The total number $n=n1+n2$ refers to the accumulative number of first openings 2 and of the second openings 3. The second number $n2$ is preferably larger than 3%, preferably than 5%, preferably than 7%, preferably than 9%, preferably than 10%, preferably than 11%, preferably than 12%, preferably than 13%, preferably than 14%, preferably than 15% of the total number n. The second number $n2$ is preferably smaller than 50%, preferably than 45%, preferably than 40%, preferably than 35%, preferably than 30%, preferably than 27%, preferably than 25%, preferably than 22%, preferably than 20%, preferably than 19%, preferably than 18%, preferably than 17% of the total number n. In one embodiment, the second number $n2$ is smaller than $n1$, preferably smaller than 50% of $n1$, preferably smaller than 40% of $n1$, preferably smaller than 30% of $n1$, preferably smaller than 25% of $n1$. In one embodiment, the second number $n2$ is larger than 5% of $n1$, preferably than 10% of $n1$, preferably than 15% of $n1$. In the example shown in FIG. 1, there are $n1=107$ first openings 2 and $n2=21$ second openings 3, thus $n=128$ is the total number of holes. Thus, second number $n2$ of second holes is here roughly 16% of the total number n of holes. This ratio of the number $n1$ of the first openings 2 and of the number $n2$ of the second openings 3 proved to be an optimal compromise between an effective harvesting and a sufficient pollen distribution for the population living in the beehive.

Preferably, the first openings 2 and the second openings 3 are arranged in a mixed manner such that each second opening 3 has a first opening in its vicinity and/or each first opening 2 has a second opening 3 in its vicinity. In the shown embodiment, the openings 2, 3 are arranged in rows, i.e. horizontal lines, preferably in at least two rows, preferably in three rows. Preferably, at least one of the rows (a mixed row) comprises first openings 2 and second openings 3. Preferably, the at least one other row comprises (only) the first openings 2. Here the mixed row comprises a sequence which alternates one first opening 2 and one second opening 3. The mixed row is preferably arranged between the other two rows. Thus, there is an upper row including (only) first openings 2, a central row including first and second openings 2, 3 and a bottom row including (only) first openings 2. The upper and/or bottom row comprises here 43 first openings 2. The mixed row comprises 21 first openings 2 and 21 second openings 3. However, different arrangements of openings 2, 3 in the beehive 10 or the pollen trap member 1 are possible as well. Preferably, the first openings 2 and the second openings 3 are included in the (same) pollen trap member 1. This and/or the mixed arrangement of the openings 2, 3 allows that the foragers use the first and second openings 2, 3 without any preference.

The entrance 11 comprises preferably an entrance opening which is covered by a pollen trap member 1. The entrance opening of the entrance 11 is preferably a horizontally extending slot as common in beehives. The height of the entrance opening or slot of the entrance 11 is preferably smaller than 5 cm, preferably than 4 cm, preferably than 3 cm, preferably than 2 cm. The width of the entrance opening or slot of the entrance 11 depends on the size of the beehive 10 and can vary for example between 10 cm and 50 cm. The pollen trap member 1 covers preferably the entrance 11, preferably the entrance opening of the entrance 11. Thus, the pollen trap member 1, in particular the portion containing the first and second openings 2, 3 has preferably a height being smaller than 5 cm, preferably than 4 cm, preferably than 2. Thus, the pollen trap member 1, in particular the portion containing the first and second openings 2, 3 has preferably a width being smaller than 70 cm, preferably than 60 cm, preferably than 50 cm and/or being larger than cm, preferably than 8 cm, preferably than 10 cm. The pollen trap member 1 is preferably a plate. The pollen trap member 1 comprises preferably the first openings 2 and the second openings 3. The first openings 2 and the second openings 3 are both connected to the opening of the entrance 11 covered by the pollen trap member 1. The minimum distance between a first opening 2 and a second opening 3 is preferably smaller than 10 cm, preferably than 7 cm, preferably than 5 cm, preferably than 4 cm, preferably than 3 cm, preferably than 2 cm, preferably than 1 cm in order to guarantee that both openings 2 and 3 are contemporaneously connected to the entrance 11 of the beehive 10 and/or to avoid that the foragers enter only through the second openings 3 without any pollen harvesting. The pollen trap member 1 is preferably removably fixed in front of (the entrance opening of) the entrance 11. The beehive 10 comprises preferably a pollen trap holder at the entrance 11 for holding a pollen trap member 1. The pollen trap holder is configured to fix the pollen trap member 1 so in front of the (opening of the) entrance 11 that the opening of the entrance 11 is covered and/or that the first openings 2 and the second openings 3 of the pollen trap member 1 are connected (contemporaneously) with the opening of the entrance 11. The pollen trap holder is further configured to remove the pollen trap member 1. Thus, the pollen trap member 1 can be placed at the pollen trap holder of existing beehives 10 without any reconfiguration of the beehive 10. In a less preferred embodiment, the pollen trap member 1 could also be arranged in a non-removable way in front of the beehive 10, or the first openings 2 and second openings 3 could be arranged directly in the beehive structure.

The beehive 10 and/or the pollen trap comprises preferably a container 12 for collecting the pollen 4 harvested from the foragers entering the beehive through the first openings 2. The container 12 is preferably arranged below the first openings 2. The container 12 is preferably removable from the beehive 10 to remove the harvested pollen. The container 12 can for example be realized as a drawer which could be slide out to remove the pollen 4 harvested in the container 12. Preferably, there is a mesh or grid 13 allowing the pollen 4 harvested from the first openings 2 to fall into the container 12 and preventing the foragers or any other bees to collect the pollen from the container 12.

Existing beehives can be upgraded easily to a beehive as described above by mounting the described pollen trap member 1 in front of the entrance 11 of the beehive.

The before described beehive can be used to continuously harvest pollen or to harvest pollen without any "measurable" interruptions as the pollen trap member 1 must not be removed for guaranteeing the survival of the population of the beehive. Thus, the pollen 4 collected from the foragers entering the first openings 2 represent a realistic sample of the pollen collected in the environment of the beehive 10 in a measurement period. With traditional pollen traps, the pollen collected were always interrupted by periods, in which the pollen trap needed to be removed from the entrance 11. The pollen trap member 1 can be kept always on the entrance 11 of the beehive 10 and the container 12 with the collected pollen 4. Thus, the pollen collected represent a significant sample of the full sample time without any interruptions.

A method of harvesting pollen according to the invention uses the above-described beehive 10 or pollen trap member 1 to harvest pollen.

Preferably, the method comprises further the step of analysing the pollen harvested. The step of analysing the pollen 4 harvested comprises preferably one or more of the following: identifying the plants from which the pollen 4 harvested is originating; identifying the relative pollen quantity per plant; identifying a contamination of the pollen, e.g. by chemicals, by fungicides, by pesticides, by aerosols. The analysis can include a genetic test of the pollen 4, a chromatography of the pollen 4, a spectrometry of the pollen 4 or any other analysing method of the pollen 4. Preferably, the pollen 4 harvested is retrieved from the container 12 and analysed in a laboratory. Preferably, the pollen 4 harvested is periodically (removed from the container 12 and) analysed. The analysis result is preferably stored together with the time or time period of harvesting the pollen 4. Thus, the periodic analysis results in a time series. The time periods between two analysis steps or two sample steps can vary over time as the analysis is performed manually. The analysis result is preferably stored in a database. The database stores preferably also a time information in relation to the analysis result. The time information is preferably the time of removing the pollen 4 from the container 12 and/or the time period of harvestings the pollen 4 analysed. The database stores preferably also a location information with the analysis result. The location information is preferably the location of the beehive 10, where the pollen 10 were harvested. The location information could be stored in the form of a geographic location data. However, the location information could also be a simple identifier identifying the beehive 10, from which the analysed pollen 4 are harvested.

Preferably, the method comprises further step of retrieving from the analysis result a conclusion about the environment around the beehive 10. The environment of the beehive 10 corresponds normally to 1500 meter (m) around the beehive. Thus, the beehive 10 with the pollen trap member 1 allows to collect in a large area pollen. The present invention allows to use forages of a beehive 10 to collect pollen of the environment and thus to collect pollen of a large area. This allows many conclusions about the environment. In the following different applications are explained.

A water company is interested in surveying the area from which the water is retrieved. This is traditionally done by getting samples of the retrieved water. However, many contaminants of the environment get only after long times into the ground water and thus to the water used. Thus, a contamination of the environment is detected only, when it is already too late. Therefore, the present invention allows to place the beehive 10 in the relevant area. The foragers of the beehive 10 collect pollen from the area of interest and the collected pollen are at least partially and continuously harvested by the first openings 2 at the entrance 11 of the beehive 10. By analysing the harvested pollen, contaminants in the environment like pesticides, heavy metals, etc. can be detected at a much earlier stage. In addition, the pollen collected by the bees represents the environment much better than the water at one or two spots in the area as the bees take the pollen from all over the area. The water company can intervene early and avoid that the contaminants get into the ground water.

The system can also be of interest to control biological farmers that they do not use pesticides. Many more applications are possible. It should be understood that the present invention is not limited to the described embodiments and that variations can be applied without going outside of the scope of the claims.

The invention claimed is:

1. Beehive for a bee species, the bee species comprise pollen collecting bees, the beehive comprising:
   a plurality of first openings designed such that the pollen collecting bees of the beehive enter the beehive through these first openings and that the pollen collecting bees lose their pollen, when enter they through the first openings;
   a plurality of second openings designed such that the pollen collecting bees of the beehive can enter the beehive through these second openings and that the pollen collecting bees keep their pollen, when they enter through the second openings, wherein the diameter of the second openings is larger than the diameter of the first openings,
   wherein the number of second openings is larger than 5% of the total number of openings constituted by the accumulative number of first openings and second openings.

2. Beehive according to claim 1, wherein the number of second openings is smaller than 30% of the total number of openings.

3. Beehive according to claim 1, wherein the diameter of the first openings is between 4 mm and 6 mm.

4. Beehive according to claim 1, wherein the first openings and the second openings are both connected to the interior of the beehive.

5. Beehive according to claim 1 comprising a pollen trap including the plurality of first openings.

6. Beehive according to claim 5, wherein the pollen trap comprises a pollen container for collecting the pollen which the pollen collecting bees lose, when they enter the first openings.

7. Beehive according to claim 5, wherein the pollen trap comprises also the second openings.

8. Beehive according to claim 5, wherein the beehive or the pollen trap comprises a removable member which can be fixed to and removed from an entrance of the beehive or pollen trap, wherein the removable member comprises the plurality of first openings and the plurality of second openings.

9. Method for harvesting pollen from a bee species in a beehive, wherein the bee species comprises pollen collecting bees, wherein the beehive having a plurality of first openings and a plurality of second openings, wherein the method comprises the steps of:
   harvesting pollen from the pollen collecting bees entering the first openings of the beehive;
   wherein, when pollen collecting bees entering through the second openings, the pollen collecting bees keep their pollen, when they enter through the second openings, wherein the diameter of the second openings is larger than the diameter of the first openings;
   wherein the number of second openings is larger than 5% of the total number of openings constituted by the accumulative number of first openings and second openings.

10. Method according to the claim 9, wherein the first openings are permanently installed in front of the entrance of the beehive to permanently collect pollen.

11. Pollen trap member configured to be installed at the entrance of a beehive for a bee species, the bee species comprises pollen collecting bees, the pollen trap member comprising:
- a plurality of first openings designed such that the pollen collecting bees of the beehive can go through the first openings and that the pollen collecting bees lose their pollen, when they go through the first openings;
- a plurality of second openings designed such that the pollen collecting bees can go through these second openings and that the pollen collecting bees keep their pollen, when they go through the second openings, wherein the diameter of the second openings is larger than the diameter of the first openings;
- characterized in that the number of second openings is larger than 5% of the total number of openings constituted by the accumulative number of first openings and second openings.

12. Pollen trap member according to claim 11, wherein the first openings and the second openings are arranged in the pollen trap member such that they are connected both to the entrance of the beehive, when the pollen trap member is installed at the entrance of the beehive.

13. Pollen trap member according to claim 11, wherein the at least some of the first openings and at least some of the second openings are arranged in one common row.

* * * * *